(12) United States Patent
Pota et al.

(10) Patent No.: US 10,664,280 B2
(45) Date of Patent: May 26, 2020

(54) FETCH AHEAD BRANCH TARGET BUFFER

(71) Applicant: MIPS Tech, LLC, Santa Clara, CA (US)

(72) Inventors: Parthiv Pota, Cupertino, CA (US); Sanjay Patel, San Ramon, CA (US); Sudhakar Ranganathan, Santa Clara, CA (US)

(73) Assignee: MIPS Tech, LLC, Santa Clara, CA (US)

(*) Notice: Subject to any disclaimer, the term of this patent is extended or adjusted under 35 U.S.C. 154(b) by 665 days.

(21) Appl. No.: 14/935,579

(22) Filed: Nov. 9, 2015

(65) Prior Publication Data

US 2017/0132009 A1 May 11, 2017

(51) Int. Cl.
G06F 9/30 (2018.01)
G06F 9/38 (2018.01)
G06F 12/0875 (2016.01)

(52) U.S. Cl.
CPC ........ *G06F 9/3806* (2013.01); *G06F 12/0875* (2013.01); *G06F 2212/452* (2013.01)

(58) Field of Classification Search
None
See application file for complete search history.

(56) References Cited

U.S. PATENT DOCUMENTS

| | | | | |
|---|---|---|---|---|
| 5,506,976 A * | 4/1996 | Jaggar | ................... | G06F 9/3844 711/137 |
| 5,701,448 A | 12/1997 | White | | |
| 6,148,396 A * | 11/2000 | Chrysos | .............. | G06F 11/3476 712/216 |
| 2005/0278517 A1 | 12/2005 | Wong et al. | | |
| 2006/0095750 A1 * | 5/2006 | Nye | ...................... | G06F 9/3848 712/240 |
| 2006/0200655 A1 | 9/2006 | Smith et al. | | |
| 2007/0294518 A1 | 12/2007 | Wang | | |
| 2013/0339695 A1 * | 12/2013 | Bonanno | ............. | G06F 9/30145 712/239 |
| 2017/0371668 A1 * | 12/2017 | Bonanno | ............. | G06F 9/30058 |

FOREIGN PATENT DOCUMENTS

GB 2 250 840 A 6/1992

* cited by examiner

*Primary Examiner* — Corey S Faherty

(74) *Attorney, Agent, or Firm* — Adams Intellex, PLC

(57) ABSTRACT

A fetch ahead branch target buffer is used by a branch predictor to determine a target address for a branch instruction based on a fetch pointer for a previous fetch bundle, i.e. a fetch bundle which is fetched prior to a fetch bundle which includes the branch instruction. An entry in the fetch ahead branch target buffer corresponds to one branch instruction and comprises a data portion identifying the target address of that branch instruction. In various examples, an entry also comprises a tag portion which stores data identifying the fetch pointer by which the entry is indexed. Branch prediction is performed by matching an index generated using a received fetch pointer to the tag portions to identify a matching entry and then determining the target address for the branch instruction from the data portion of the matching entry.

19 Claims, 6 Drawing Sheets

FETCH AHEAD BRANCH TARGET BUFFER

BACKGROUND

A branch target buffer (BTB) is a memory element associated with a pipeline in a processor and which stores information about previously executed branch instructions of a computer program. A branch predictor uses the data stored in the BTB to predict the direction that the program flow will take in the case of instructions known to cause possible flow changes, such as branch instructions. A BTB therefore uses information about program flow in the past to predict the current program flow. Branch prediction is useful as it enables instructions to be speculatively executed by the processor before the outcome of the prediction is known.

The embodiments described below are provided by way of example only and are not limiting of implementations which solve any or all of the disadvantages of known branch predictors and BTBs.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A fetch ahead branch target buffer is used by a branch predictor to determine a target address for a branch instruction based on a fetch pointer for a previous fetch bundle, i.e. a fetch bundle which is fetched prior to a fetch bundle which includes the branch instruction. An entry in the fetch ahead branch target buffer corresponds to one branch instruction and comprises a data portion identifying the target address of that branch instruction. In various examples, an entry also comprises a tag portion which stores data identifying the fetch pointer by which the entry is indexed. Branch prediction is performed by matching an index generated using a received fetch pointer to the tag portions to identify a matching entry and then determining the target address for the branch instruction from the data portion of the matching entry.

A first aspect provides a branch predictor comprising: a fetch ahead branch target buffer comprising a plurality of data entries indexed using fetch pointers, each entry corresponding to a branch instruction and comprising a data portion arranged to store data identifying a target address of the branch instruction to which the entry corresponds, wherein an entry is indexed by a fetch pointer of a fetch bundle which is fetched prior to a fetch bundle including the branch instruction to which the entry corresponds; an input configured to receive a fetch pointer from a fetch stage in a processor; branch prediction logic configured to determine a target address for a branch instruction using the fetch ahead branch target buffer and the received fetch pointer; and an output configured to provide the target address for the branch instruction to the fetch stage, wherein the branch instruction is part of a fetch bundle that is fetched after a fetch bundle identified by the received fetch pointer.

A second aspect provides a method of branch prediction implemented in hardware logic, the method comprising: receiving, at an input of a branch predictor, a fetch pointer from a fetch stage in a processor; determining a target address for a branch instruction using a fetch ahead branch target buffer and the received fetch pointer, the fetch ahead branch target buffer comprising a plurality of data entries indexed using fetch pointers, each entry corresponding to a branch instruction and comprising a data portion arranged to store data identifying a target address of the branch instruction, wherein an entry is indexed by a fetch pointer of a fetch bundle which is fetched prior to a fetch bundle including the branch instruction to which the entry corresponds; and outputting, via an output of the branch predictor, the target address for the branch instruction to the fetch stage, wherein the branch instruction is part of a fetch bundle that is fetched after a fetch bundle identified by the received fetch pointer.

A third aspect provides a non-transitory computer readable storage medium having stored thereon computer readable instructions that, when processed at a computer system for generating a manifestation of an integrated circuit, cause the computer system to generate a manifestation of an integrated circuit comprising a branch predictor, the branch predictor comprising: a fetch ahead branch target buffer comprising a plurality of data entries indexed using fetch pointers, each entry corresponding to a branch instruction and comprising a data portion arranged to store data identifying a target address of the branch instruction to which the entry corresponds, wherein an entry is indexed by a fetch pointer of a fetch bundle which is fetched prior to a fetch bundle including the branch instruction to which the entry corresponds; an input configured to receive a fetch pointer from a fetch stage in a processor; branch prediction logic configured to determine a target address for a branch instruction using the fetch ahead branch target buffer and the received fetch pointer; and an output configured to provide the target address for the branch instruction to the fetch stage, wherein the branch instruction is part of a fetch bundle that is fetched after a fetch bundle identified by the received fetch pointer.

The preferred features may be combined as appropriate, as would be apparent to a person skilled in the art, and may be combined with any of the aspects of the invention.

BRIEF DESCRIPTION OF THE DRAWINGS

Embodiments of the invention will be described, by way of example, with reference to the following drawings, in which.

Figure 1A:
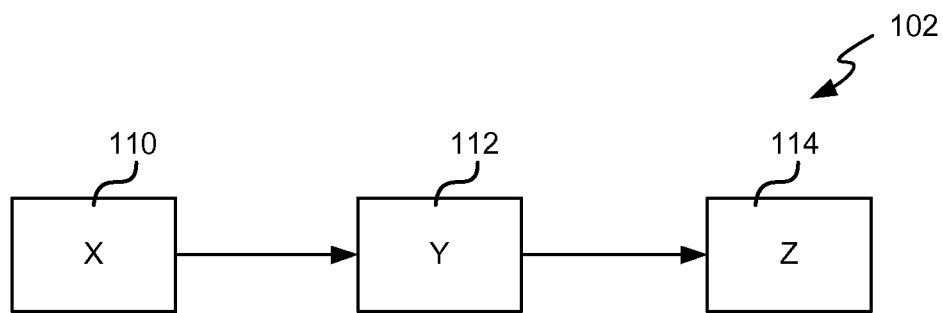
FIGS. 1A-1C show schematic diagrams illustrating the operation of a fetch ahead branch target buffer.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Instructions are fetched by a processor in bundles, referred to as 'fetch bundles' or 'fetch blocks' which may comprise one or more instructions (e.g. depending on the number of fetch instructions per cycle which are supported). In an example implementation, a fetch bundle may comprise up to 4 instructions.

A branch predictor uses an index to perform a look-up in a branch target buffer (BTB) which stores the most recent target addresses for branch instructions. In the event of a match between the index and an entry in the BTB (which may be referred to as a 'hit'), the branch predictor uses data in the matching entry to determine (e.g. predict) a target address for the branch instruction. In various examples the index which is used to access the BTB may be the fetch pointer for the fetch bundle containing the branch instruction (where the fetch pointer is the address of the starting instruction in the fetch bundle) or it may be generated from the fetch pointer. Where the starting instruction is the branch instruction (e.g. where the branch instruction is the only instruction in the fetch bundle or the first instruction in the fetch bundle) the index which is used to access the BTB may be the address of the branch instruction or it may be generated using the address of the branch instruction. The frequency with which a branch predictor (and hence a BTB) can generate a hit directly impacts the speed with which an instruction can be executed and so the performance can be improved by increasing the number of entries in the BTB. Increasing the number of entries in a BTB typically implies increasing the size of the BTB which requires more memory and may increase the latency of the look-up process (i.e. it may take two clock cycles to perform the look-up in the BTB instead of only one cycle). If not addressed, the latency may result in stalls (also referred to as 'bubbles') in the instruction fetch pipeline.

A BTB may be updated after each execution of a branch instruction. For example, after a branch instruction has been executed, the execution pipelines may provide the branch predictor with the address (which may also be referred to as the program counter) of the instruction that followed the branch instruction. The branch predictor may then replace the predicted target value in the BTB with the received address. Alternatively, the BTB may comprise a counter (e.g. a 2-bit counter) for each branch instruction and keep track of the number of mis-predictions for the branch instruction. In these cases, the predicted target address may only be updated after two consecutive mis-predictions.

A fetch ahead branch target buffer is described herein which can be used to compensate for any latency in performing look-ups in the BTB and so reduce or eliminate stalls caused by the latency. In a branch predictor comprising a fetch ahead BTB, instead of using the fetch pointer for the fetch bundle containing the branch instruction (which as described above may, in some cases, be the address of the branch instruction itself) to determine (e.g. predict) a target address for that particular branch instruction (as would be the case for a conventional BTB), the target address is determined in advance using the fetch pointer for a previous fetch bundle and consequently the BTB is referred to as a fetch ahead BTB. For example, the fetch pointer of an $(n-\alpha)^{th}$ fetch bundle (or information derived from the fetch pointer of the $(n-\alpha)^{th}$ fetch bundle) may be used to predict a target address for the first taken branch instruction in the $n^{th}$ fetch bundle. In various examples $\alpha=1$ and the fetch ahead BTB operates as a one fetch ahead BTB (1ABTB) and in such examples, an fetch pointer of the $(n-1)^{th}$ fetch bundle is used to predict a target address for the first taken branch instruction (which may be the only branch instruction) in the $n^{th}$ fetch bundle, i.e. the target address is predicted one fetch bundle ahead of where it would conventionally be generated.

The operation of a fetch ahead BTB can be described with reference to FIG. 1. FIG. 1A shows an example instruction fetch sequence 102 comprising three N-instruction fetch bundles 110, 112 and 114. The instruction fetch bundles 110-114 are labelled X, Y, Z where X, Y and Y are the fetch pointers (i.e. starting addresses) of the corresponding N-instruction bundle block. In this example, one of the instructions $Y_{BR}$ in the N-instruction fetch bundle 112 (with fetch pointer Y) is a branch instruction with a target address of Z (i.e. the fetch pointer of fetch bundle Z). The fetch pointer transition from X to Y could be due to a branch instruction (e.g. a branch instruction $X_{BR}$ in the N-instruction fetch bundle 110 with fetch pointer X, the branch instruction having a target address of Y) or a sequential fall through fetch (e.g. as a result of a branch not being taken).

In order to predict the branch target address for instruction $Y_{BR}$, a branch predictor comprising a fetch ahead BTB (which in this particular example is a 1ABTB) does not perform a look-up in the fetch ahead BTB using information relating to fetch pointer Y, but instead has already predicted the target address by performing a look-up in the fetch ahead BTB using information relating to a previous fetch pointer (e.g. fetch pointer X).

Assuming that the prediction occurred sufficiently ahead of the need for the target address of instruction $Y_{BR}$ to accommodate any latency in the BTB access, there is no delay as a result of the look-up in the BTB and the instruction at the target address, Z, can be fetched immediately.

By using a fetch ahead BTB as described herein, instead of a conventional BTB, the size of the BTB (and hence latency of performing individual look-ups in the BTB) is, in various examples, not affected. Depending upon the type(s) of branch instruction for which the fetch ahead BTB operates and/or the number of fetch bundles ahead that the predictions are being made (e.g. the value of $\alpha$), the method of indexing the BTB may be modified and/or the size of the BTB may be increased (e.g. to improve the accuracy of the prediction for larger values of a and/or dynamic branches).

Figure 1B:
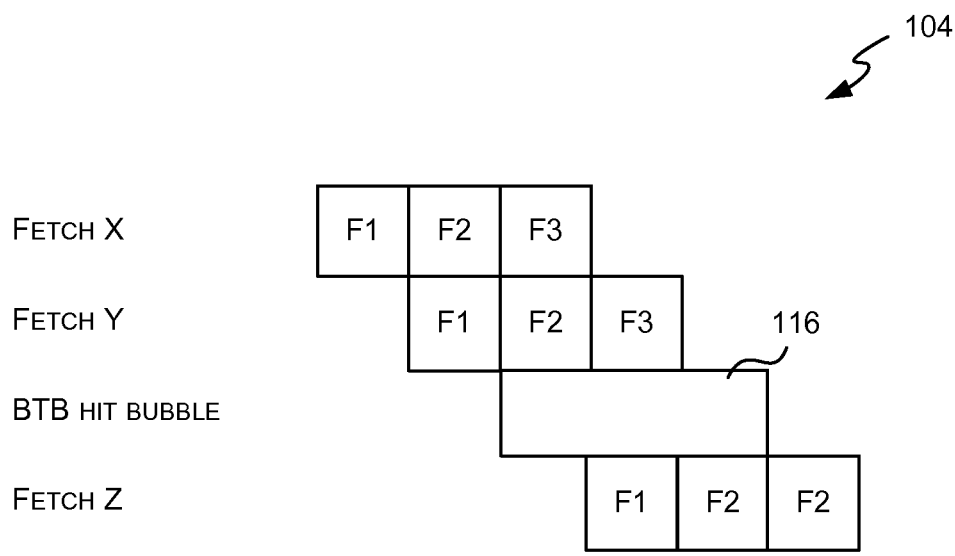
Figure 1C:
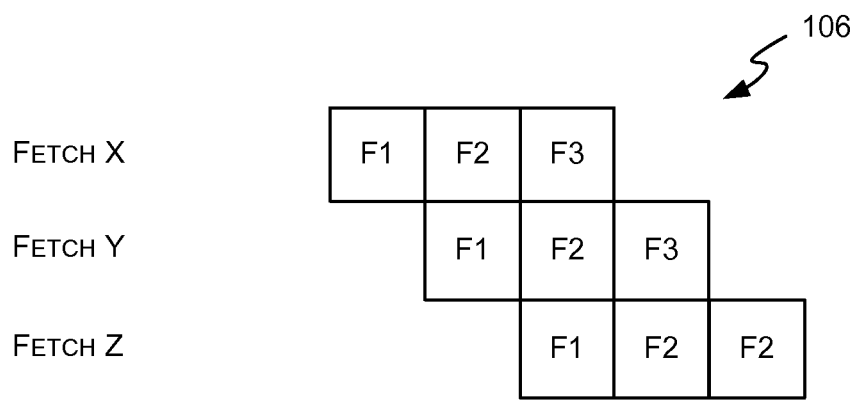

FIGS. 1B and 1C show how stalls in the fetch pipeline which are caused by latency in BTB look-ups can be eliminated. The instruction fetch pipeline 104 for the fetch sequence 102 with the transition from block X to block Y being the result of a sequential fall through fetch (which does not require a BTB look-up) is shown in FIG. 1B. The transition from block Y to block Z does, however, require a BTB look-up (i.e. to determine the target address of instruction $Y_{BR}$) and in this example, a look-up in the BTB takes two clock cycles. This latency results in a BTB hit bubble 116, where the pipeline is stalled because it is not possible to perform the fetch of the instruction at target address Z as this address is not yet known. The instruction fetch pipeline 106 of FIG. 1C shows the improvement achieved using a 1ABTB. As described above, the target address of instruction $Y_{BR}$ is predicted using the fetch pointer of the previous fetch bundle and so the delay in fetching instructions from block Z is eliminated.

Figure 2:
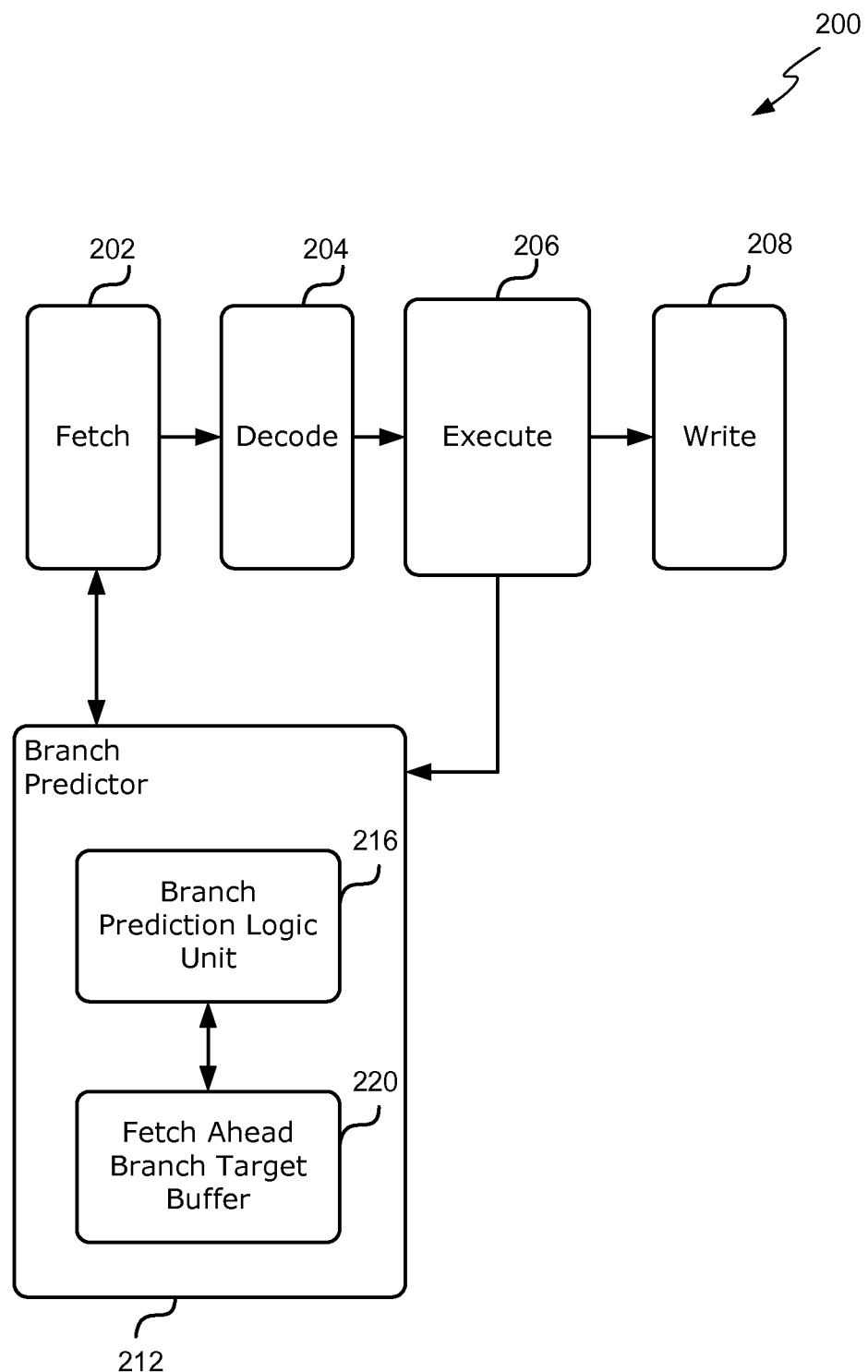
FIG. 2 shows a schematic diagram of an example processor which comprises a fetch ahead branch target buffer.

FIG. 2 shows a schematic diagram of an example processor 200 which comprises a fetch ahead branch target buffer 220 as described above and in which the methods described herein may be implemented. Although FIG. 2 shows an in-order processor, the methods may also be implemented in a processor which processes instructions out-of-order, i.e. in an out-of-order processor. In this example the processor 200 is a single-threaded processor, however the methods are also applicable to multi-threaded processors.

The processor 200 comprises a fetch stage 202, a decode stage 204, an execution stage 206 and a write stage 208. The processor pipeline 202-204-206-208 may be used to execute several instructions in parallel and an operation is fetched by the fetch stage 202 and flows through each of the stages (fetch-decode-execute-write) in order. At any given time, a separate independent operation may exist in each of the stages 202-208 of the pipeline.

The fetch stage 202 is configured to fetch instructions from a program (in program order) as indicated by a program counter (PC). As described above, instructions are fetched in fetch bundles comprising one or more instruction. Once an instruction is fetched it is provided to the decode stage 204 which is arranged to interpret the instructions. In particular, each instruction may comprise a register write operation; one or more register read operations; and/or an arithmetic or logical operation. A register write operation writes to a destination register and a register read operation reads from a source register.

The execution stage 206 is responsible for executing instructions and may comprise a plurality of functional units (or execution pipelines) configured to execute specific types of instructions. For example, the execution stage 206 may comprise one or more of a load-store unit, an integer unit, a floating point unit (FPU), a digital signal processing (DSP)/single instruction multiple data (SIMD) unit, or a multiply accumulate (MAC) unit. The write stage 208 writes the results of the execution to memory.

The processor 200 further comprises a branch predictor 212 which is configured to predict which direction the program flow will take in the case of instructions known to cause possible flow changes, such as branch instructions. Branch prediction is useful as it enables instructions to be speculatively executed by the processor 200 before the outcome of the branch instruction is known. When the branch predictor predicts the program flow accurately, this improves performance of the processor 200. However, if the branch predictor does not correctly predict the branch direction, then a mis-prediction occurs which needs to be corrected before the program can continue. To correct a mis-prediction, the speculative instructions are abandoned, and the fetch stage 202 starts fetching instructions from the correct program branch.

The branch predictor 212 comprises the fetch ahead BTB 220 and a branch prediction logic unit 216 which comprises hardware logic which is configured to perform the look-up in the fetch ahead BTB 220 and also hardware logic which is configured to update the entries in the fetch ahead BTB 220. The operation and structure of the branch prediction logic unit 216 and the fetch ahead BTB 220 are described in more detail below with reference to FIGS. 3-6.

It will be appreciated that other processors may not comprise all the functional elements shown in FIG. 2 (i.e. one or more of the functional elements shown in FIG. 2 may be omitted) and a processor may comprise additional functional elements not shown in FIG. 2.

Figure 3:
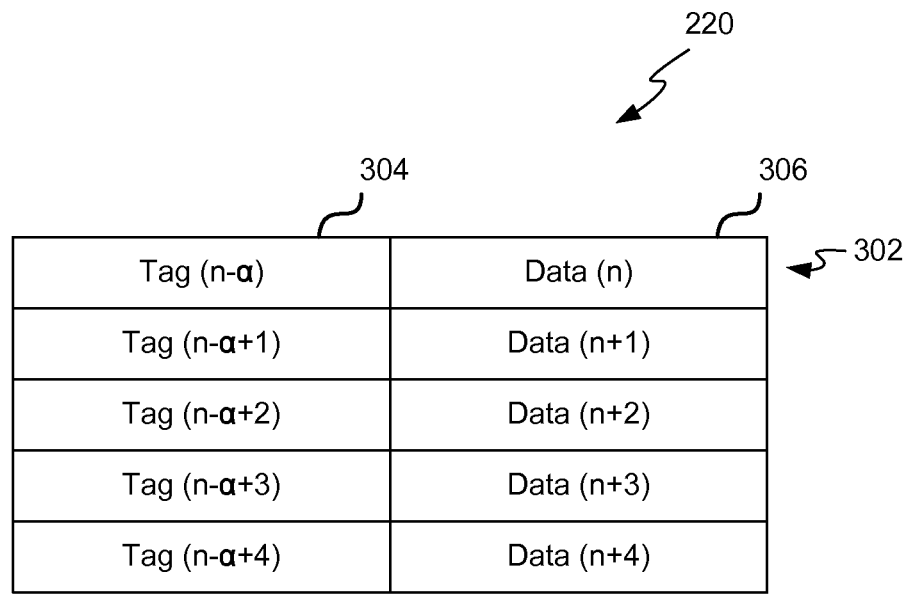
FIG. 3 is a schematic diagram of an example fetch ahead branch target buffer.

FIG. 3 is a schematic diagram of an example fetch ahead BTB 220. The fetch ahead BTB 220 comprises a plurality of entries 302 (although FIG. 3 shows only 5 entries, it will be appreciated that a fetch ahead BTB may comprise many more entries). Each entry may comprise both a tag portion 304 and a data portion 306, although in some examples (e.g. for direct-mapped BTBs) the tag portion may be omitted. Each entry in the fetch ahead BTB corresponds to a branch instruction; however, as described above, the entries are indexed using fetch pointers (which may or may not be the addresses of branch instructions). The tag portion 304 of an entry (where provided) contains information that identifies a fetch pointer and is used to identify an entry by matching an index (which may be the fetch pointer or may be generated using the fetch pointer) against the tag portions 304. In various examples the tag portion 304 may contain the index (e.g. such that the matching operation is looking for an exact match between the index and the tag portion) and in other examples, the tag portion 304 may not comprise the index and so the matching may operate differently. For a multi-threaded processor, the tag portion 304 may also identify a thread (e.g. by the tag portion being some function of the thread ID and the fetch pointer).

The data portion 306 of an entry contains information that identifies a target address of a branch instruction in a fetch bundle which is executed subsequently to the instructions in the fetch bundle identified by the tag portion 304 in the same entry). In various examples the data portions 306 may contain the target addresses and in other examples they may contain information from which the target addresses can be derived.

The data stored in the fetch ahead BTB is generated and stored based on previously executed branch instructions but is used to predict current/future program flow.

As shown in FIG. 3, if the tag portion 304 of an entry 302 identifies a fetch pointer $n-\alpha$, the data portion 306 of the same entry 302 identifies a target address of a branch instruction in a subsequent fetch bundle n, where $\alpha$ is a positive (and hence non-zero) integer. The tag portions 304 of different entries 302 identify different fetch pointers and the target addresses which are identified by the data portions 306 may be the same or different (e.g. two or more branch instructions may have the same target address).

Figure 4:
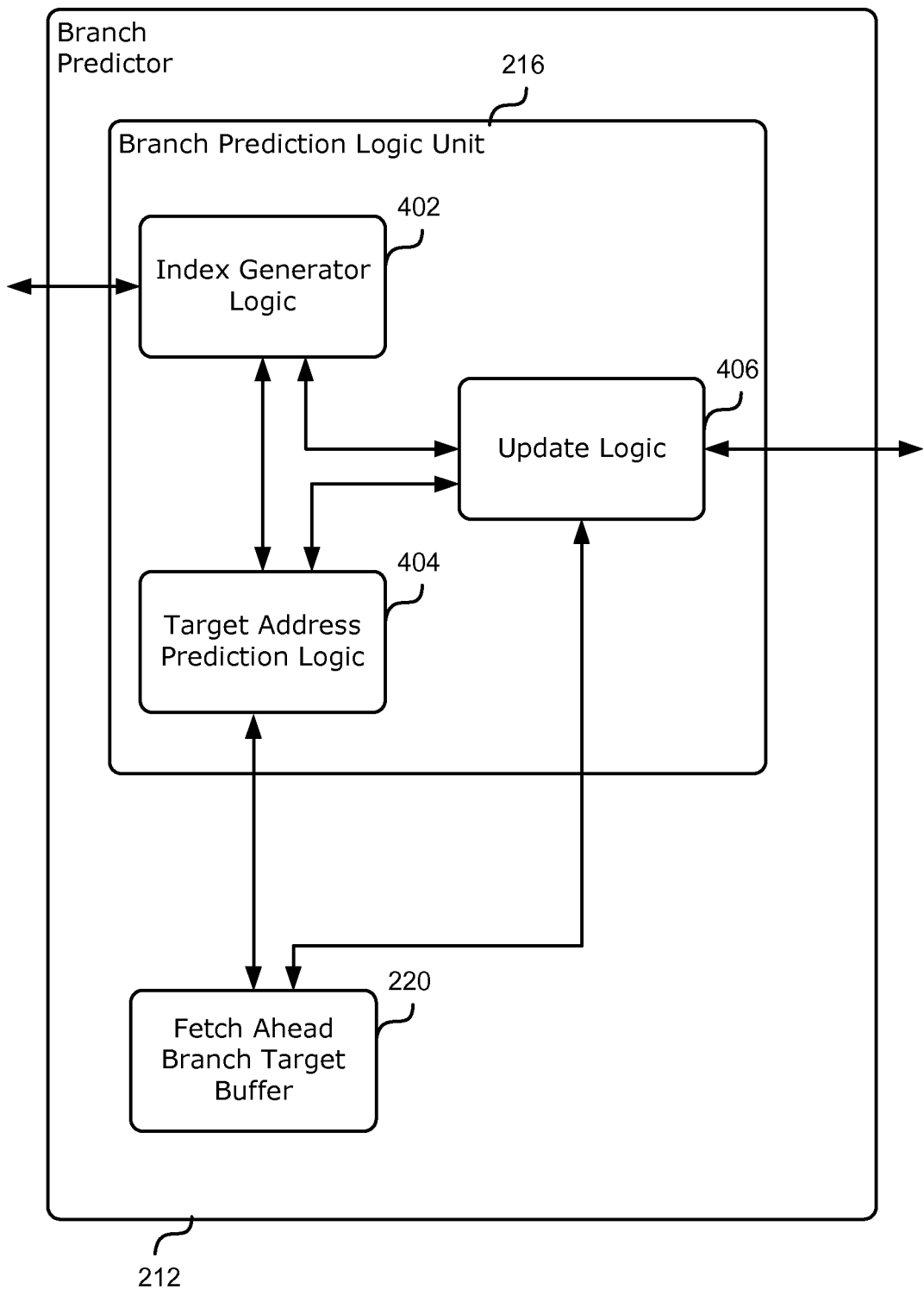
FIG. 4 is a schematic diagram showing the branch predictor of FIG. 2 in more detail.

FIG. 4 is a schematic diagram showing the branch predictor 212 of FIG. 2 in more detail. As shown in FIG. 4, the branch prediction logic unit 216 comprises index generator logic 402, target address prediction logic 404 and update logic 406. These three functional elements 402-406 within the branch predictor 212 are implemented in hardware logic and although they are shown and described separately, when implemented in hardware they may be combined in any way. The operation of the branch predictor 212 and its component parts can be described with reference to FIG. 5.

Figure 5:
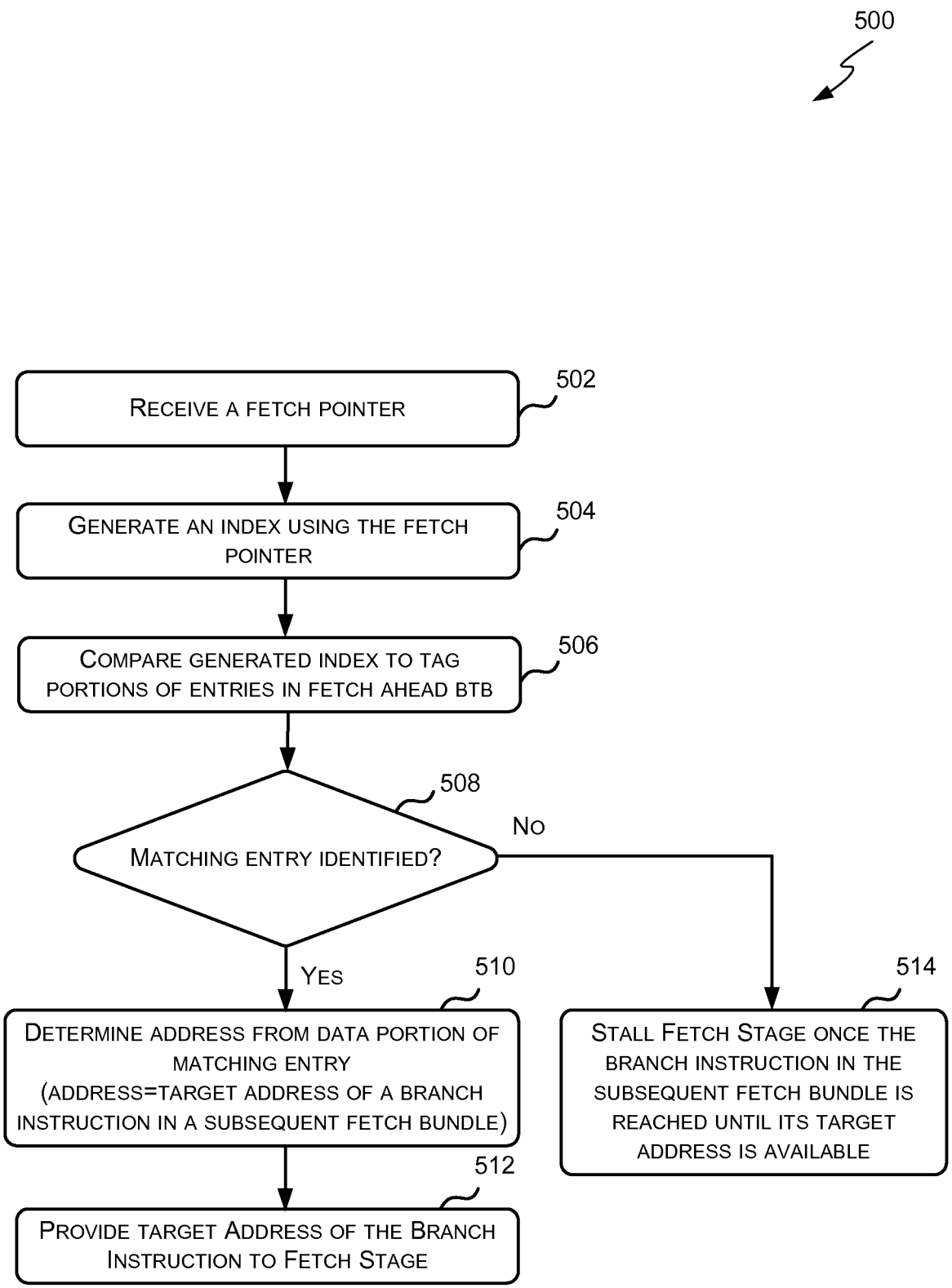
FIG. 5 is a flow diagram of an example method of predicting the target address of a branch instruction.

FIG. 5 is a flow diagram of an example method of predicting the target address of a branch instruction. The branch predictor 212 receives, at an input, a fetch pointer from the fetch stage 202 in the processor 200 (block 502). The branch predictor 212, and more specifically the index generator hardware logic 402, generates an index using the fetch pointer (block 504). In various examples and as described above, the index may be the same as the fetch pointer and in other examples, the index may be generated using a history table for the particular branch instruction, where the history table may be a taken/not-taken history or a global history register. The branch predictor 212, and more specifically the target address prediction logic 404, compares the index which has been generated (in block 504) to the tag portions of entries in the fetch ahead BTB 220 (block 508). The comparison may be performed against all entries (e.g. for a fully-associative BTB) or against a proper subset of the entries (e.g. for a way-associative BTB).

As described above, in some examples, there may be no tag portions in the entries in the fetch ahead BTB 220 and in such examples, the index which is generated (in block 504) and which may be the same as the fetch pointer may directly identify a specific entry in the fetch ahead BTB 220 (i.e. for a direct-mapped BTB) such that the comparison operation is not required (i.e. block 508 is omitted and the method proceeds to block 510).

If a match is identified ('Yes' in block 508), a target address is determined (by the target address prediction logic 404) using the information in the data portion of the matching entry (block 510). As described above, this target address is not the target address of an instruction in the fetch bundle with the fetch pointer which was received in block 502 (which may be referred to as fetch bundle n-a) but is instead the target address of a branch instruction in a subsequent fetch bundle (which may be referred to as fetch bundle n) and this target address is provided to the fetch stage 202 (block 512) via an output. The fetch stage 202 subsequently uses the target address to fetch the next instruction after it has fetched the branch instruction to which it relates (i.e. the first taken branch instruction in fetch bundle n). In the event that a match is not identified in the fetch ahead BTB ('No' in block 508), the fetch stage 202 will subsequently need to be stalled (block 514) once it reaches the subsequent branch instruction (i.e. the first taken branch instruction in fetch bundle n) for which no target address can be predicted (as a result of the 'No' in block 508) until the target address of the instruction (i.e. the first taken branch instruction in fetch bundle n) is available.

There are many different ways that the index may be generated (in block 504 and by the index generator logic 402) from the information relating to the branch instruction. As described above, in various examples, the fetch pointer (as received in block 502) or a part of the fetch pointer (where, as described above, is an address or program counter) may be used as the index. In other examples, the fetch ahead BTB may be indexed by a combination (e.g. hashing) of both the fetch pointer of the fetch bundle containing the branch instruction and history information for previous branch instructions. The branch predictor 212 may therefore comprise additional data structures (not shown in FIG. 4) which are configured to store the history information.

The history information provides a path of how the program arrived at the branch instruction and may be the path history (i.e. a history of the previous branch instruction targets) or the taken/not-taken history (i.e. a history of the outcome of the previous conditional branches, where each outcome for each branch is either that the branch was taken or was not taken). For example, the path history may comprise the last B bits of the target addresses of the N preceding branch instructions (e.g. B=N=4) and the taken/not-taken history may comprise M bits, with each bit representing the outcome of one of the M preceding conditional branches (e.g. M=12 or 14).

GB Patent No. 2506462 describes further methods of generating an index which do not use the address of the branch instruction but instead use a combination of the indirect path history and the taken/not-taken history.

Figure 6:
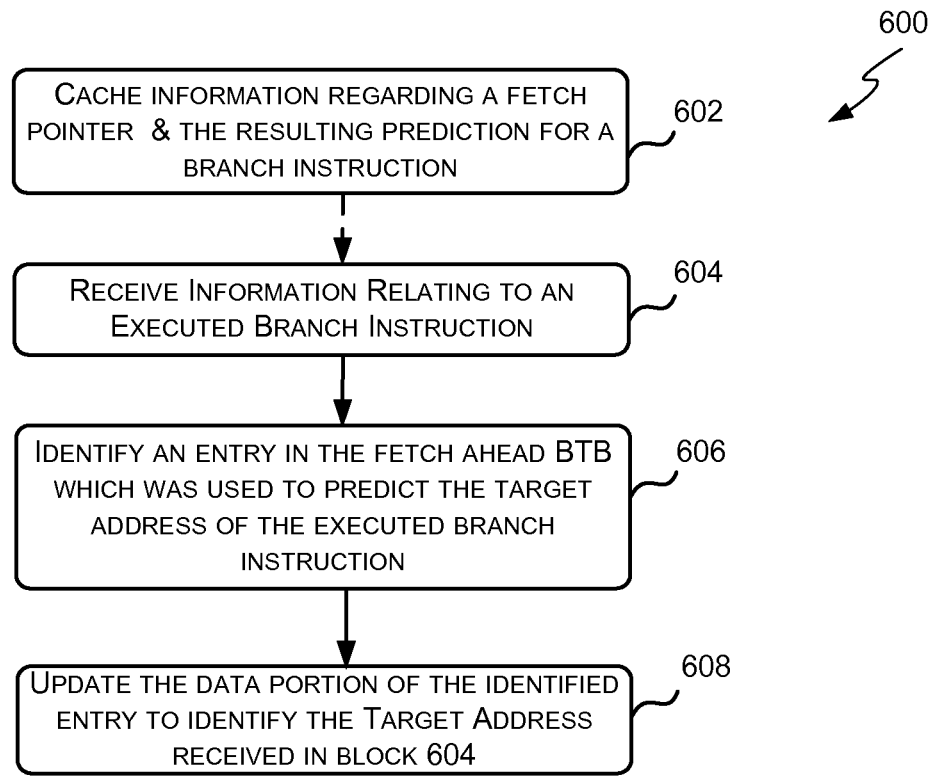
FIG. 6 is a flow diagram of an example method of updating a fetch ahead branch target buffer.

FIG. 6 is a flow diagram 600 of an example method of updating the fetch ahead BTB 200 and this method may be implemented by the update logic 406 within the branch predictor 212. When a prediction is made (by the target address prediction logic 404 in block 510 of FIG. 5 using the fetch pointer for the n–α$^{th}$ fetch bundle), information regarding the prediction and the fetch pointer received in block 502 and/or the index generated in block 504 is cached by the branch predictor 212 and more specifically by the update logic 406 (block 602).

When the branch predictor 212 (e.g. update logic 406) receives information relating to an executed branch instruction (block 604) from, for example, the execution stage 206 (e.g. for the first taken branch instruction in the n$^{th}$ fetch bundle), the cached information (from block 602) is used to identify an entry in the fetch ahead BTB which was used to predict the target address of the executed branch instruction (block 606 e.g. the entry for the fetch pointer of the n–α$^{th}$ fetch bundle). Having identified the appropriate entry in the fetch ahead BTB (in block 606), the data portion of the identified entry is updated to identify the target address received in block 604 (block 608).

The methods described above may be used for one or more different types of branch instructions including one or more of: conditional branch instructions, unconditional branch instructions and return-type branch instructions. In various examples, the methods may also be used for dynamic branches. Depending upon the different types of branch instructions for which the method is implemented, different techniques for generating the index (e.g. in block 504 of FIG. 5) may be used (e.g. a global history register may be used when generating the index for a dynamic branch instruction). In various examples, a processor may comprise more than one branch predictor 212, with different branch predictors being used for different types of branch instruction (e.g. a branch predictor comprising a fetch ahead BTB may be provided to predict the target addresses for conditional, unconditional and return-type branch instructions and a separate jump register cache and associated hardware logic may be used to predict the target addresses for dynamic branch instructions). Where a fetch ahead BTB is provided to predict the target addresses for return-type branch instructions, the fetch ahead BTB does not need to store the target address and the target address could instead come from a return-prediction-stack (RPS). In various examples, one or more fetch ahead BTBs may be provided, e.g. with different fetch ahead BTBs for different types of branch instruction.

Using a fetch ahead BTB 220 as described above enables any latency in performing look-ups in the BTB to be hidden such that the latency does not cause stalls in the operation of the fetch stage 202.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a processing unit as described herein. For example, a non-transitory computer readable storage medium may have stored thereon computer readable instructions that, when processed at a computer system for generating a manifestation of an integrated circuit, cause the computer system to generate a manifestation of a processor as described in the examples herein or to generate a manifestation of a processor configured to perform a method as described in the examples herein. The manifestation of a processor could be the processor itself, or a representation of the processor (e.g. a mask) which can be used to generate the processor.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

What is claimed is:

1. A branch predictor, comprising:
   a fetch ahead branch target buffer having a plurality of data entries indexed using fetch pointers (X,Y), each entry corresponding to a branch instruction ($X_{BR}$, $Y_{BR}$) and including a data portion arranged to store data identifying a target address (Y,Z) of the branch instruction ($X_{BR}$, $Y_{BR}$) to which the entry corresponds, wherein an entry for a branch instruction ($Y_{BR}$) is indexed by a fetch pointer (X) of a starting instruction of a first fetch bundle comprising a plurality of instructions including a branch instruction ($X_{BR}$) which is fetched prior to another fetch bundle including the branch instruction ($Y_{BR}$) to which the entry corresponds;

an input configured to receive the fetch pointer (X) from a fetch stage in a processor;

branch prediction logic configured to determine a target address (Z) for the branch instruction ($Y_{BR}$) included in said another fetch bundle using the fetch ahead branch target buffer and the received fetch pointer (X); and an output configured to provide the target address (Z) for the branch instruction ($Y_{BR}$) to the fetch stage, wherein the branch instruction ($Y_{BR}$) is part of said another fetch bundle that is fetched after the first fetch bundle identified by the received fetch pointer (X), wherein a transition from the first fetch bundle to said another fetch bundle is due to a branch instruction ($X_{BR}$) in the first fetch bundle which has a target address (Y) of a starting instruction of said another fetch bundle.

2. A branch predictor according to claim 1, wherein each entry further comprises a tag portion arranged to store data identifying the fetch pointer by which the entry is indexed.

3. A branch predictor according to claim 2, wherein the branch prediction logic comprises:

index generator logic configured to generate an index using information relating to the received fetch pointer (X); and target address prediction logic configured to identify a matching entry in the fetch ahead branch target buffer by matching the index to a tag portion and to determine the target address (Z) for the branch instruction ($Y_{BR}$) using the data portion of the matching entry.

4. A branch predictor according to claim 3, wherein the index is at least part of the fetch pointer (X).

5. A branch predictor according to claim 3, wherein the index is all of the fetch pointer (X).

6. A branch predictor according to claim 3, wherein the information relating to the branch instruction ($X_{BR}$) which is fetched prior to said another fetch bundle including the branch instruction ($Y_{BR}$) to which the entry corresponds comprises history data.

7. A branch predictor according to claim 1, further comprising:

update logic configured to update the data portion of an entry in the fetch ahead branch target buffer based on cached information relating to the received fetch pointer (X), the target address (Z) for the branch instruction ($Y_{BR}$) determined by the branch prediction logic and information relating to execution of the branch instruction ($Y_{BR}$) received from an execution stage in the processor.

8. A method of branch prediction implemented in hardware logic, the method comprising:

receiving, at an input of a branch predictor a fetch pointer (X) from a fetch stage in a processor;

determining a target address (Z) for a branch instruction ($Y_{BR}$) using a fetch ahead branch target buffer and the received fetch pointer (X), the fetch ahead branch target buffer comprising a plurality of data entries indexed using fetch pointers (X,Y), each entry corresponding to a branch instruction ($X_{BR}$, $Y_{BR}$) and comprising a data portion arranged to store data identifying a target address (Z) of the branch instruction ($Y_{BR}$), wherein an entry is indexed by a fetch pointer (X) of a starting instruction of a first fetch bundle comprising a plurality of instructions which is fetched prior to another fetch bundle including the branch instruction ($Y_{BR}$) to which the entry corresponds; and outputting, via an output of the branch predictor, the target address (Z) for the branch instruction ($Y_{BR}$) to the fetch stage, wherein the branch instruction ($Y_{BR}$) is part of said another fetch bundle that is fetched after the first fetch bundle comprising a plurality of instructions including a starting instruction identified by the received fetch pointer (X), wherein a transition from the first fetch bundle to said another fetch bundle is due to a branch instruction ($X_{BR}$) in the first fetch bundle which has a target address (Y) of a starting instruction of said another fetch bundle.

9. The method according to claim 8, wherein each entry further comprises a tag portion arranged to store data identifying the fetch pointer by which the entry is indexed.

10. The method according to claim 9, wherein determining a target address (Z) for a branch instruction ($Y_{BR}$) using a fetch ahead branch target buffer comprises:

generating an index using information relating to the received fetch pointer (X);

comparing the index to tag portions in the fetch ahead branch target buffer; and in response to identifying a match between the index and a tag portion of an entry in the fetch ahead branch target buffer, determining the target address (Z) for the branch instruction ($Y_{BR}$) using the data portion of the matching entry.

11. The method according to claim 8, further comprising:

caching information relating to the fetch pointer (X) and the target address (Z) for the branch instruction ($Y_{BR}$); and in response to receiving information relating to execution of the branch instruction ($Y_{BR}$) from an execution stage in the processor, updating the data portion of the matching entry in the fetch ahead branch target buffer based the information received.

12. A non-transitory computer readable storage medium having encoded thereon computer executable instructions that when executed cause a processor to perform the method of claim 8.

13. A non-transitory computer readable storage medium having stored thereon computer readable instructions that, when processed at a computer system for generating a manifestation of an integrated circuit, cause the computer system to generate a manifestation of an integrated circuit comprising a branch predictor, the branch predictor comprising:

a fetch ahead branch target buffer comprising a plurality of data entries indexed using fetch pointers (X,Y), each entry corresponding to a branch instruction ($X_{BR}$, $Y_{BR}$) and comprising a data portion arranged to store data identifying a target address (Z) of the branch instruction ($Y_{BR}$) to which the entry corresponds, wherein an entry is indexed by a fetch pointer (X) of a starting instruction of a first fetch bundle comprising a plurality of instructions which is fetched prior to another fetch bundle comprising a plurality of instructions including the branch instruction ($Y_{BR}$) to which the entry corresponds;

an input configured to receive a fetch pointer (X) from a fetch stage in a processor;

branch prediction logic configured to determine a target address (Z) for the branch instruction ($Y_{BR}$) using the fetch ahead branch target buffer and the received fetch pointer (X); and an output configured to provide the target address (Z) for the branch instruction ($Y_{BR}$) to the fetch stage, wherein the branch instruction ($Y_{BR}$) is part of said another fetch bundle comprising a plurality of instructions that is fetched after the first fetch bundle comprising a plurality of instructions having a starter instruction identified by the received fetch pointer, wherein a transition from the first fetch bundle to said another fetch bundle is due to a branch instruction ($X_{BR}$) in the first fetch bundle which has a target address (Y) of a starting instruction of said another fetch bundle.

14. The non-transitory computer readable storage medium according to claim 13, wherein each entry further comprises a tag portion arranged to store data identifying the fetch pointer by which the entry is indexed.

15. A branch predictor as claimed in claim 1, wherein said another fetch bundle comprises a plurality of instructions including at least a starting instruction and the branch instruction ($Y_{BR}$).

16. The method as claimed in claim 8, wherein said another fetch bundle comprises a plurality of instructions including at least a starting instruction and the branch instruction ($Y_{BR}$).

17. A branch predictor according to claim 6 wherein the history data comprises history information for previous branch instructions.

18. The method according to claim 9 wherein determining a target address (Z) for a branch instruction ($Y_{BR}$) using a fetch ahead branch target buffer comprises:

generating an index using information relating to the received fetch pointer (X);

comparing the index to tag portions in the fetch ahead branch target buffer; and in response to failing to identify a match between the index and a tag portion of an entry in the fetch ahead branch target buffer, stalling the fetch stage until a target address (Y) of a starting instruction of said another fetch bundle is available.

19. The method according to claim 10 wherein comparing the index to tag portions in the fetch ahead branch target buffer comprises comparing the index to tag portions of all entries in the branch target buffer.

* * * * *